# 3,705,120
ROOM TEMPERATURE VULCANIZING COMPOSITION

Nobuhisa Kawaguchi, Yokohama, Kanagawa-ken, Japan, assignor to Fuji Polymer Industries Co., Ltd., Tokyo, Japan
No Drawing. Continuation-in-part of abandoned application Ser. No. 749,618, Aug. 2, 1968. This application Apr. 12, 1971, Ser. No. 133,396
Claims priority, application Japan, Aug. 21, 1967, 42/53,279
Int. Cl. C08h 9/00
U.S. Cl. 260—18 S          6 Claims

ABSTRACT OF THE DISCLOSURE

A fluid composition which hardens quickly upon contact with air is composed of the principal components (1) a diorganopolysiloxane endblocked by hydroxyl radicals, (2) a minor amount of an organoalkoxysilane or an organoorthosilicate, (3) a minor amount of an aluminum alcoholate and (4) a minor amount of an organic tin salt.

CROSS-REFERENCE TO RELATED CASE

This application is a continuation-in-part of application Ser. No. 749,618, filed Aug. 2, 1968, now abandoned.

BACKGROUND OF THE INVENTION

The novel composition of this invention relates to the field of caulking and sealing materials used in filling a space between solids, or for filling holes and cracks in surfaces. These compositions as developed heretofore include those caulking and sealing compositions which are so constituted that they solidify upon exposure to air, and which includes such materials known in the art as room temperature vulcanizing materials, often referred to as RTV materials.

These prior sealant compositions have been made in a variety of physical forms ranging from liquids to stiff pastes. For the purpose of this specification this range will be referred to broadly as fluid. Such prior fluid sealants are composed of a variety of ingredients including silicones, natural rubber, neoprene, butadiene, polyurethane, Thiokol, epoxy resins, polyvinyl chloride resins and polyvinyl acetate resins.

The properties often desired of sealants of this kind include that of changing from the fluid state to a solid or an elastic state upon application. This property is useful in forming a durable seal between solid surfaces that are subjected to vibration or to other relative movements such as encountered with temperature changes.

The known sealants, as described above, have one of the two general properties of (1) solidifying or (2) remaining in the state of an adhesive paste after being applied to fill the gap between solid materials or to fill cracks or holes in solid materials. The propensity of prior caulking or sealing compositions to exhibit one of these two general properties has required the user to select from the two available types so as to meet his particular needs.

Compositions that tend to set up to solids, i.e. (1) above, have the following ideal requirements. They should exhibit appropriate practical speed of solidification, a low coefficient of shrinkage, strong adhesive properties, and resistance to the abrasive or deteriorative environmental conditions of weather, water, oil and industrial chemicals, a high vibration absorption, and a high resistance to temperature extremes.

None of the prior solidifying sealants have these ideal properties. This fact has resulted in a growing critical need for improvement in solidifying caulking and sealing compositions because of the rapid developments that have occurred in industrial endeavor, particularly in that of the construction of buildings and maritime structures. There has been a marked tendency toward the type of construction requiring improved structural materials and methods to be used, for example, in tall buildings, underground structures, and marine engineering works.

These structures present an increased demand for materials which can provide air-tight and water-tight sealant closure, especially closures that will form rapidly and provide the air-tightness and water-tightness with a minimum of delay in set-up times and in acquiring the necessary sealant function and adhesive strength.

SUMMARY OF THE INVENTION

The novel composition of this invention has, as a characteristic property, that of solidifying almost instantly at its surface when exposed to or contacted with the ambient atmosphere, and the further property of progressive solidification into the body of the composition situated beneath the exposed surface, so as to produce a strong, adhesive, elastic body, ideally suited for the caulking and sealing uses described above.

The novel composition contains as a principal ingredient a diorganopolysiloxane having as a unit structure $(R)_2SiO$ in which R is the same or different hydrocarbon radical of from 1 to 8 carbon atoms, typified by lower alkyl of from 1 to 8 carbon atoms, lower alkenyl of from 1 to 8 carbon atoms and aromatic of from 6 to 8 carbon atoms. Examples of these radicals are methyl, ethyl, vinyl and phenyl. In the unit as noted the substituents, R, can be the same or different radicals. The diorganopolysiloxane is further characterized by having ends blocked by hydroxyl radicals and by being a fluid, as defined above, at normal temperatures, i.e., in the range of 10° to 30° C.

The novel compositions have as a second ingredient (per 100 parts by weight of diorganopolysiloxane), 0.5 to 10.0 parts by weight of an organoalkoxysilane of the formula:

wherein R' represents a radical having the same meaning as R, above; R" represents an alkyl radical of 1 to 3 carbon atoms, as methyl, ethyl and n-propyl; and n is 1 or 0. Examples are methyl trimethoxysilane and ethyl triethoxysilane. Instead of the organoalkoxysilane, there can be used a like amount of an organoorthosilicate containing an alkoxy radical of 1 to 4 carbon atoms; or the partial condensate (e.g. up to the tetramer) of the organoorthosilicate. Examples are n-propyl orthosilicate and ethyl orthosilicate.

The partial condensate is a known condensate and is a siloxane containing alternate silicon and oxygen atoms

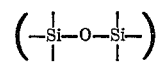

They are formed by the condensation of hydroxyl or alkoxy groups attached to adjacent molecules of the silicon compound which must contain at least two hydroxy or alkoxy groups in order to interact to form a linear molecular chain.

The third ingredient of my novel composition (per 100 parts by weight of diorganopolysiloxane) is 0.1 to 10.0 parts by weight of an aluminum alcoholate of the formula:

wherein R''' is an alkyl radical of 1 to 4 carbon atoms as methyl, ethyl, n-propyl and isobutyl.

The fourth ingredient of my novel composition (per 100 parts by weight of diorganopolysiloxane) is 0.1 to 5.0 parts by weight of a tin salt of the group consisting of (1) an organic tin salt of a fatty acid and (2) a tin salt of a fatty acid. The organic element of (1) can be one or two alkyl radicals of 2 to 6 carbon atoms, e.g. monobutyl or dibutyl, and the fatty acid radical can have from 2 to 18 carbon atoms. Examples are tin octanoate, dibutyl tin diacetate, dibutyl tin adipate, dibutyl tin dioctanoate dibutyl tin dilaurate, dibutyl tin dipropionate, dibutyl tin dibutyrate, monobutyl tin triacetate, monobutyl tin trioctanoate and monobutyl tin trilaurate.

The novel composition of this invention, in addition to the four ingredients named above can contain a variety of other optional ingredients which do not enter into or significantly modify the novel desired properties, such as an appropriate organic solvent to render the composition more liquidlike, as for use as a coating; a coloring ingredient such as, for example, an organic dye such as phthalocyanine blue or a pigment such as titanium oxide, an agent for coloring and increasing heat conductance or transmission such as zinc oxide, iron oxide, carbon black, graphite, powdered metal such as copper or aluminum powder; a reinforcing agent such as silica, diatomaceous earth, alumina, metal silicates, silicate powder; a filler such as talc, asbestos or powdered glass; a combustion retarding agent such as antimony trioxide or chlorinated paraffin.

The novel compositions described above, with or without the optional additives described above, will, upon exposure of a mass to air, react with the moisture which is present in the air within a very short period of time, e.g. several seconds, to form a tack-free film over the entire exposed surface, and then the solidification (RTV) of the composition will take place progressively into the deeper portions of the mass. When solidification is complete, ordinarily requiring several hours, the entire exposed mass will have become rubber-like and elastic with high resistance to vibration. It can thus be used as a caulking or sealing compound for a wide variety of uses and applications. The solidification of the composition is attended by low shrinkage.

Use of the optional ingredients lends still further versatility to my novel composition in that the viscosity of the composition prior to exposure can be controlled with solvents over the range of a flowable liquid to a paste, and the color can be controlled, as will be apparent to those skilled in the art.

The use of my novel composition as a paint or coating composition having improved sealant properties is within the purview of this invention. Suitable solvents for use in such coating compositions are xylene, trichloroethylene and the like. When the composition of this invention is used as a coating composition or caulking or sealing compound with structural materials such as glass, aluminum, iron, steel or wood, its adhesive properties can be improved by the use of a primer coating consisting essentially of an organosilicone, e.g. DC Primer 4094 (a product of Dow Corning Corporation, U.S.A.) on the surface of the material prior to the application of my novel compositions.

DESCRIPTION OF THE PREFERRED EMBODIMENTS

The following specific examples illustrate my invention.

Example 1

100 parts by weight of methylphenyl polysiloxane having hydroxyl radicals at the terminals and containing 5.0% by mole ratio of phenyl radicals and exhibiting a viscosity of 12,000 cs. at 25° C., and 194.1 parts by weight of zinc oxide were thoroughly mixed. To this mixture was added 2.3 parts by weight of ethylorthosilicate, and they were further mixed. The resulting mixture was then thoroughly mixed, in a completely dry atmosphere, with 6.9 parts by weight of 20% aluminum triisopropylate xylene solution and also with 1.09 parts by weight of dibutyl tin dioctoate. The resulting composition temporarily solidified during the mixing step, but it gradually liquified at normal temperature, and while in this state the composition was successfully packed in a collapsible tube. A mass of the composition was squeezed out from this tube and brought into contact with the ambient air having a relative humidity of 62%. The exposed composition solidified at the surface in about 2 seconds into a tack-free mass. In 24 hours, the mass of the squeezed out composition solidified completely and formed an elastic mass 3 mm. in thickness. This elastic mass had a heat transmission coefficient of 0.0009 cal./cm.$^2$/° C./sec./cm.

Example 2

100 parts of hydroxyl end-blocked dimethyl polysiloxane (2.000 cs.), 1 part of dibutyl tin dilaurate and 2 parts of n-propyl orthosilicate were mixed, and to the thus obtained mixture was added, in a completely dry atmosphere, a mixture consisting of 30 parts of anhydrous xylene, 30 parts of anhydrous isopropyl alcohol and 5 parts of aluminum isopropylate.

The composition thus obtained formed a gel at the time of mixing, but was converted to a fluid state after being left stand at 60° C. for 3 hours and was then packed in a closed tube.

When this composition was squeezed from the tube and was brought into contact with the ambient air having a relative humidity of 60%, it instantly formed a film on the surface, and became a completely vulcanized elastomer in sections up to 3 mm. thick after the lapse of 12 hours.

Example 3

To 100 parts of hydroxyl end-blocked dimethyl polysiloxane (8,000 cs.) were added 0.5 parts of dibutyl tin dioctanoate and 5 parts of vinyltriethoxysilane, and the resulting mixture was further mixed uniformly with 10 parts of anhydrous xylene aluminum triethylate solution containing 5 parts aluminum salt.

The mixture was gelated once at that time, but after being left to stand at 60° C. for 3 hours, there was obtained a fluid composition.

When this composition was brought into contact with moist air, it instantly formed a film on the surface, being completely vulcanized to an elastomer within 24 hours.

Example 4

A mixture consisting of 100 parts of hydroxyl end-blocked methyl phenyl polysiloxane containing 5.0 mol percent of phenyl radical (15,000 cs.), 13 parts of diatomaceous earth, 9 parts of chlorosilane treated silica, 17 parts of ferric oxide and 7 parts of antimony trioxide was dehydrated in a vacuum dryer heated at 110° C. With the thus dehydrated mixture were mixed 3 parts of isopropyl orthosilicic ester and 0.5 part of dibutyl tin diacetate, and to the same was added, in a completely dry atmosphere, 3 parts of aluminum triethylate to obtain a paste composition.

This composition, upon being squeezed out in a 3 mm. thick section from a tube into the air having a relative humidity of 55% and at 25° C., instantly formed a tack-free film on the surface, and was vulcanized to its center within 24 hours.

Example 5

This example illustrates the remarkable effect obtained from the joint use of an aluminum alcoholate and a tin salt as discussed in this specification as contrasted with an otherwise identical composition, but not containing a tin salt.

A composition (A) was made up consisting of:

100 parts by weight of hydroxyl end-blocked dimethylpolysiloxane (2,000 cs.)
60 parts of anhydrous xylene
20 parts of isopropyl alcohol
5 parts of aluminum isopropylate
2 parts of n-propyl orthosilicate
0.5 part of dibutyl tin dilaurate A second composition (B), for comparison purposes was made up of the same ingredients, except that it did not contain the dibutyl tin dilaurate.

The two compositions (A) and (B) were stored in tin tubes for four months to simulate conventional storage conditions for caulking or sealing compositions. After storage the compositions were exposed to air at room temperature by squeezing out a sample from the tubes. Composition (A) became solidified i.e., underwent room temperature vulcanization in less than a day, whereas composition (B) did not solidify over a period of seven days.

Example 6

An experiment to illustrate the critical character of my novel four-element composition compared with a variety of two-element and three-element compositions composed respectively of two-ingredient and three-ingredient combinations of the same four materials, as follows:

Composition I 100 parts by weight of hydroxyl end-blocked dimethyl polysiloxane (2,000 cs.)
30 parts of anhydrous xylene
30 parts of isopropyl alcohol
5 parts of aluminum isopropylate
2 parts of n-propyl orthosilicate
0.5 part of dibutyl tin dilaurate Composition II was the same as I above, except that the orthosilicate and the tin salt were omitted.

Composition III was the same as I, above except that the tin salt was omitted.

Composition IV was the same as I above except that the orthosilicate was omitted.

Composition V was the same as I above, except that the aluminum isopropylate was omitted.

Composition I was mixed uniformly by forming a fluid of the first three ingredients and then uniformly blending in the last three to produce a gelated mixture. The mixture was heated to restore its initial fluidity. The fluid product, upon exposure to air, instantly formed a film on the surface and underwent complete room temperature vulcanization after seven hours.

Composition II was mixed in a manner analogous to I, but underwent gelation and partial vulcanization during the process of preparation, and was therefore an impractical sealant.

Composition III, though mixed in a manner analogous to I, required about 12 hours to undergo room temperature vulcanization. It retained a softness, however, that made it of impractical use as a sealant.

Composition IV was mixed in a manner analogous to I, but was slower to form a tack-free surface. Although it underwent some room temperature vulcanization, it retained a softness that made it of impractical use as a sealant.

Composition V required 24 hours to undergo room temperature vulcanization and did not form an initial tack-free surface film. The surface was still sticky in some areas after 24 hours.

I claim:

1. A composition of matter for use as a caulking or sealing compound and capable of forming rapidly a tack-free surface film and progressively undergoing room temperature vulcanization on exposure to air, said composition comprising as principal ingredients (a) 100 parts by weight of a fluid diorganopolysiloxane having as a unit structure $(R)_2SiO$ in which R is the same or different hydrocarbon radical of from 1 to 8 carbon atoms, said diorganopolysiloxane being further characterized and as having terminals blocked by hydroxyl radicals, (b) 0.5 to 10.0 parts by weight of a member of the group consisting of (b-1) an organoalkoxysilane of the formula:

$$R'_n Si(OR'')_{4-n}$$

wherein R' is a hydrocarbon radical of from 1 to 8 carbon atoms and R'' is an alkyl radical of 1 to 3 carbon atoms, $n$ is 1 or 0 and (b-2) an organoorthosilicate containing an alkoxy radical of 1 to 4 carbon atoms, and (b-3) the partial hydrolysis condensate of (b-2), (c) 0.1 to 10.0 parts by weight of an aluminum alcoholate of the formula:

$$Al(OR''')_3$$

wherein R''' is an alkyl radical of 1 to 4 carbon atoms, and (d) 0.1 to 5.0 parts by weight of a tin salt of the group consisting of (d-1) an organic tin salt of a fatty acid, and (d-2) a tin salt of a fatty acid, said fatty acids containing from 2 to 18 carbon atoms.

2. The composition of claim 1 which further contains sufficient solvent to render it liquid for use as a coating composition.

3. The composition of claim 1 wherein (a) is methylphenyl polysiloxane having hydroxyl radicals at the terminals, (b) is ethylorthosilicate, (c) is aluminum triisopropylate, and (d) is dibutyl tin dioctanoate.

4. The composition of claim 1 wherein (a) is dimethyl polysiloxane having hydroxyl radicals at the terminals, (b) is vinyltriethoxysilane, (c) is aluminum triethylate, and (d) is dibutyl tin dioctanoate.

5. The composition of claim 1 wherein (a) is methylphenylpolysiloxane having hydroxyl radicals at the terminals, (b) is isopropyl orthosilicate, (c) is aluminum triethylate and (d) is dibutyl tin diacetate.

6. The composition of claim 1 wherein (a) is dimethyl polysiloxane having hydroxyl radicals at the terminals, (b) is n-propyl orthosilicate, (c) is aluminum isopropylate and (d) is dibutyl tin dilaurate.

References Cited

UNITED STATES PATENTS 3,432,463   3/1969   Hittmair et al. _____ 260—46.5
3,481,899   12/1969  Marwitz et al. _____ 260—17.4

DONALD E. CZAJA, Primary Examiner

M. I. MARQUIS, Assistant Examiner

U.S. Cl. X.R.

117—124 F, 135.1, 148; 260—33.45 B, 33.65 B, 33.85 B, 375 R, 45.7 R, 45.75 R, 46.5 E, 46.5 G, 825